Jan. 31, 1928.
M. I. PUPIN
1,657,587
ELECTRICAL PULSE GENERATOR
Filed Aug. 7, 1924
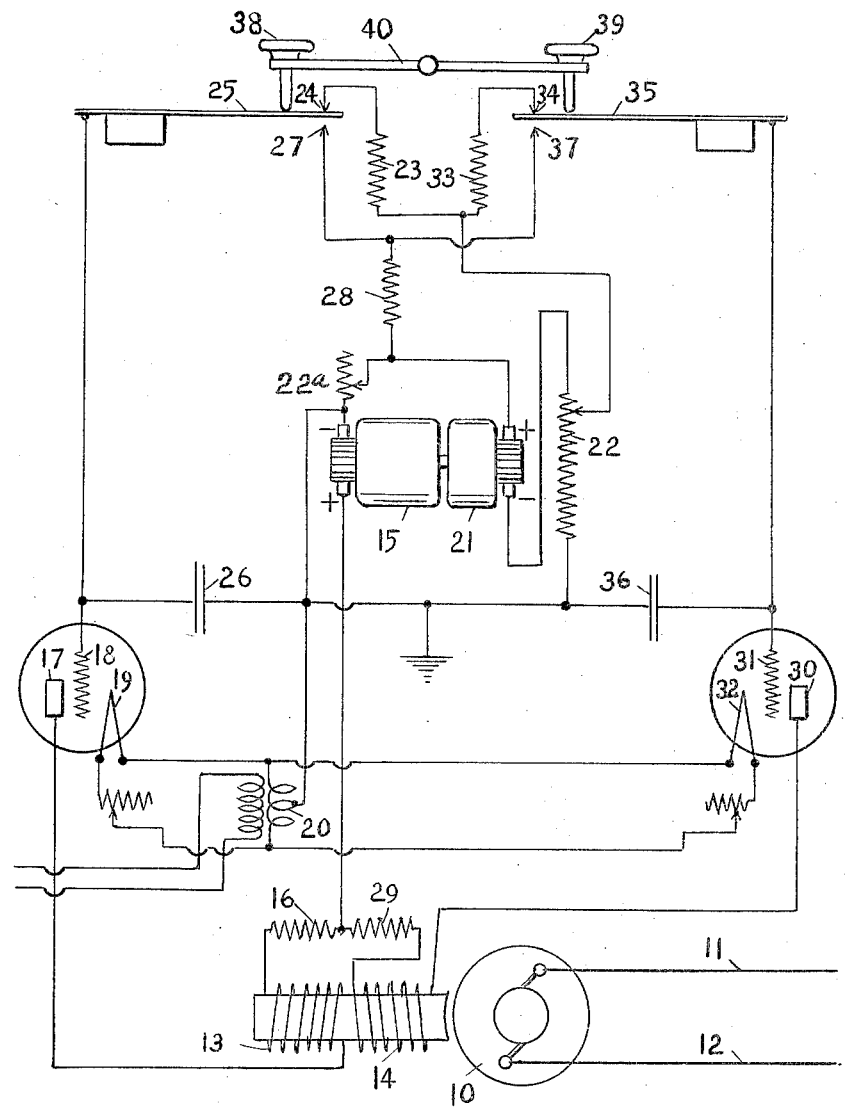
Michael Idvorsky Pupin,
By *Samuel W. Balch*
Attorney.

Patented Jan. 31, 1928.

UNITED STATES PATENT OFFICE.

MICHAEL IDVORSKY PUPIN, OF NORFOLK, CONNECTICUT.

ELECTRICAL PULSE GENERATOR.

Application filed August 7, 1924. Serial No. 730,774.

This invention relates to a means of generating electrical pulses by exciting the field of a dynamo electrical machine impulsively. This is accomplished by connecting the magnetizing field coils of the generator in the plate circuits of thermionic tubes, the thermionic currents of which are started and stopped by charging their grids to a higher or lower potential with respect to the filaments.

The object of this invention is to produce impulsively electromotive forces and currents for signaling, such as are required on ocean cables and long land lines, by making and breaking contacts between which the current flow is excessively small and sparking is thereby avoided.

A further object is to provide a system by which the impulses may be applied at rapidly succeeding time intervals without excessive sparking at contact points.

A further object is to provide a system by which both positive and negative impulses can be applied in rapid succession without changing the resistance between the ground and conductor over which the impulses are transmitted, as is the case in the usual cable and telegraph practice, especially when the ground connection is through a comparatively low and constant impedance.

A further object is to provide a system which can be actuated from such mechanism as is usually employed in telegraphy for sending by impressing positive and negative pulses upon a telegraph transmission conductor, as by telegraph keys, or perforated tapes, or through sensitive relays from received telegraphic signals, which are then repeated and greatly amplified by the power of a dynamo-electric pulse generator.

In the accompanying sheet of drawings which forms a part of this description, the figure is a diagrammatic representation of the instrumentalities associated in this invention.

Referring to the figure, provision is made to transmit pulses both positive and negative from a direct-current pulse generator 10 to lines 11, 12. The pulse generator is preferably provided with two sets of field coils 13, 14 on a suitably laminated steel core, these being connected so that when one set is energized, current of one polarity will be generated, and when the other set is energized, current of the other polarity will be generated. Current for energizing these field coils is supplied from a winding 15 of a double-wound field-current generator, which generates, for example, five hundred volts. The circuit for the field 13 is from the positive brush through a resistance 16, to the plate 17 of a thermionic tube, thence when not opposed, through the grid 18 to the filament 19 of the tube, thence to the middle point of a transformer winding 20 which supplies the filament heating current, and from this middle point to the grounded negative brush of the winding. Flow through this circuit is arrested in the tube when the grid is charged negatively to a sufficiently high degree. For this purpose a second winding 21 is provided on the field-current generator, which generates for example, three hundred volts. This winding has its negative brush connected to ground through a high resistance 22 and its positive brush is connected through a suitable resistance $22^a$ to the grounded negative brush of the other winding. At a suitable adjustable point of resistance 22 a connection is made through a high resistance 23 to a back contact 24, which through a spring 25 gives to the grid 18 and a condenser 26 a suitable potential which is negative with respect to the filament 19, to the point of symmetry of which the positive brush is connected through the adjustable resistance $22^a$ and the middle point of the transformer winding 20. From the positive brush, a connection is made with an under contact 27 through a high resistance 28 which gives to this contact a suitably high positive potential.

If now the spring 25 is pressed down, thereby breaking contact with its back contact 24 and making contact with its under contact 27, the grid will be cut off from the source of negative potential by which it was charged negatively and through the under contact will be connected through the high resistance 28 with the positive brush of the winding by which it will be charged positively with respect to the filament. Current can them flow between the plate 17 and the filament 19, and through the winding 13 of the pulse generator, which will now be magnetized and a certain electromotive force will be developed in the armature of the pulse generator.

Through a similar set of connections, current for energizing in a contrary direction the other set of field coils 14 of the pulse generator from the winding 15 of the field-current generator is supplied through a circuit which leads from the positive brush through a resistance 29 to the plate 30 of a second thermionic tube, thence when not opposed, through the grid 31 to the filament 32 of the tube, thence to the middle point of the transformer winding 20, and from this middle point to the grounded negative brush of the winding. Flow through this circuit is arrested in the tube when the grid 31 is negatively charged from the second winding 21 of the field-current generator, which has its negative brush normally connected also through the adjustable point of the high resistance 22, through a high resistance 33 to a back contact 34 which through a spring 35 gives to the grid 31 and a condenser 36 a suitable potential which is negative with respect to the filament 32 to the point of symmetry of which the positive brush is also connected through the adjustable resistance 22ª and the middle point of the transformer winding 20. From the positive brush connection is made with an under contact 37 through the high resistance 28 which gives this contact a suitably high positive potential.

If now while the first spring 25 is in contact with its back contact 24, the second spring 35 is pressed down, thereby breaking contact with its back contact 34 and making contact with its under contact 37 the grid 31 will be cut off from the source of negative potential by which it was charged and through its under contact will be connected through the high resistance 28 with the positive brush of the winding and will be charged positively. Current can then flow between the plate 30 and the filament 32 and through the winding 14 of the pulse generator, which will now be magnetized oppositely from the magnetism which was produced by the first field and an electromotive force of opposite polarity will be developed in the armature of the pulse generator.

It is not intended that both springs shall ever be actuated at the same time, and to indicate that this is not to happen, keys 38, 39 for the operation of the contact springs are shown at opposite ends of an intermediately fulcrumed lever 40. In practice the contact springs are actuated by any suitable mechanism such as is usually employed in telegraphy for impressing positive and negative impulses upon a telegraphic transmission conductor.

For ordinary telegraphy it is necessary that the pulse generator field should reach its full value in about a one-hundred and twenty-fifth part of a second. The field core as well as the armature core of the pulse generator must therefore be sufficiently laminated. For the rapidities of makes and breaks which occur in ordinary telegraphy, particularly over long submarine cables, fourteen mills sheet steel affords a sufficiently good lamination. Also the magnetizing current must attain its full value in a sufficiently short time. For example, assume that the internal resistance R in each of the plate circuits of the thermionic tubes together with the external resistances 16 or 29 is five thousand ohms, and the inductance L of the field coil of the pulse generator is ten henrys, then the growth of the current C is given by the following formula.

$$C = \frac{E}{R}\left(1 - e^{-kt}\right)$$

in which E is the electromotive force in the plate circuit and $k = \frac{R}{L}$. Since R divided by L is five hundred, it is obvious that when the time $t$ is a one-hundred and twenty-fifth part of a second, the current C will have attained practically its full value.

By diminishing the number of turns in the magnetizing coils, which diminishes L, and by increasing R, the rapidity of the establishment of the full value of the magnetizing current and of the magnetic flux can be increased to any reasonable amount, and the value of the resulting flow can be made to reach a desirable limit by increasing suitably the value of E. This can be done by a proper design of the thermionic tubes. The lowest value of the internal resistance of the tube is taken, which is the value when the grid is positively charged. But since the internal resistance of the tube increases when the thermionic current is diminished by the increase of the negative potential on the grid, it is obvious that the field of the pulse generator will lose or gain its magnetic flux at a rate which also depends upon the rate at which the grid is charged. This time interval can be regulated by the resistances 28, 23 and 33 in the grid circuits. Let these resistances be each equal to one hundred thousand ohms, and let the capacity of each grid and its associated condenser be equal to twenty-five milli-microfarads, then the constant $k$ will be $$k = \frac{1}{25 \times 100,000 \times 0.000,000,001} = 400$$

It will be approximately the same as the mean value of that of the field coils of the pulse generator. Under these conditions the magnetic field of the pulse generator will rise and fall similarly and the pulse generated by the armature will be suitably rounded.

I claim—

In a signal transmission system, the combination of two thermionic tubes, circuits for the grid and plate of each tube, sources of electromotive force for the circuits, a pulse generator, means including connections from the plate circuits of the tubes for oppositely magnetizing the generator field, means for varying the impedance in the grid circuit of one of the tubes to vary the excitation of one of the windings to produce impulses of one polarity in the line, and means for varying the impedance in the grid circuit of the other tube to produce impulses of the other polarity in the line, the impedance of the plate circuits and of the conductors connecting the grids to the charging sources being so adjusted that the magnetic flux produced by one winding when the current in the other winding is interrupted will have a time constant which is determined by the inductance and the ohmic resistance of the winding.

Signed at New York, N. Y., this sixth day of August, 1924.

MICHAEL IDVORSKY PUPIN.